(12) United States Patent
Armangau et al.

(10) Patent No.: US 10,482,065 B1
(45) Date of Patent: Nov. 19, 2019

(54) MANAGING DELETION OF REPLICAS OF FILES

(71) Applicant: EMC Corporation, Hopkinton, MA (US)

(72) Inventors: Philippe Armangau, Acton, MA (US); Junping Zhao, Beijing (CN); Fenghao Zhang, Chongqing (CN); Gang Xie, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 298 days.

(21) Appl. No.: 14/674,956

(22) Filed: Mar. 31, 2015

(51) Int. Cl.
*G06F 16/174* (2019.01)

(52) U.S. Cl.
CPC .................. *G06F 16/1748* (2019.01)

(58) Field of Classification Search
CPC .................. G06F 17/30088; G06F 16/1748
See application file for complete search history.

(56) References Cited

U.S. PATENT DOCUMENTS

| | | | |
|---|---|---|---|
| 6,105,030 A * | 8/2000 | Syed | G06F 17/30575 |
| 8,223,788 B1 * | 7/2012 | Perelstain | 370/412 |
| 9,152,338 B2 * | 10/2015 | Eggers | G06F 17/302 |
| 2006/0036663 A1 * | 2/2006 | Kwon | G06F 17/30117 |
| 2006/0184589 A1 * | 8/2006 | Lees | G06F 17/30351 |
| 2006/0271604 A1 * | 11/2006 | Shoens | G06F 17/30088 |
| 2008/0046476 A1 * | 2/2008 | Anderson | G06F 17/30088 |
| 2008/0114951 A1 * | 5/2008 | Lee | G06F 11/1469 711/162 |
| 2008/0222154 A1 * | 9/2008 | Harrington | G06F 17/30206 |
| 2008/0281877 A1 * | 11/2008 | Wayda | G06F 11/1435 |
| 2008/0320258 A1 * | 12/2008 | Wayda | G06F 11/1435 711/162 |
| 2009/0193064 A1 * | 7/2009 | Chen | G06F 17/30315 |
| 2009/0276593 A1 * | 11/2009 | Jacobson | G06F 3/0611 711/162 |
| 2009/0307291 A1 * | 12/2009 | Ye | G06F 3/0608 |
| 2010/0124234 A1 * | 5/2010 | Post | H04L 47/29 370/412 |
| 2013/0325806 A1 * | 12/2013 | Bachar | G06F 17/30174 707/638 |
| 2013/0325808 A1 * | 12/2013 | Bachar | G06F 17/3023 707/640 |
| 2014/0006354 A1 * | 1/2014 | Parkison | G06F 17/30194 707/649 |
| 2014/0189313 A1 * | 7/2014 | Rozas | G06F 9/3814 712/214 |

\* cited by examiner

*Primary Examiner* — Jeff A Burke
*Assistant Examiner* — Huen Wong
(74) *Attorney, Agent, or Firm* — Krishnendu Gupta; Deepika Bhayana

(57) ABSTRACT

A method is used in managing deletion of replicas of files. A request is received to delete a replica of a file of a file system. The replica of the file represents a state of the file at a particular prior point in time. The replica is associated with a group including a set of replicas of the file system identified for deletion. Each replica is deleted in the group concurrently by using a delete marker. The delete marker is used for tracking deletion of each replica in the group.

20 Claims, 10 Drawing Sheets

MANAGING DELETION OF REPLICAS OF FILES

BACKGROUND

Technical Field

This application relates to managing deletion of replicas of files.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Additionally, the need for high performance, high capacity information technology systems are driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

An operating system, executing on a data storage system such as a file server, controls the allocation of a memory of the data storage system to host systems or clients connected to the data storage system. Allocation is generally performed at a page granularity, where a page is a selected number of contiguous blocks. The particular size of a page is typically a function of an operating system, the page size may be 8 kilobytes (KB).

To the operating system of a data storage system, a file system is a collection of file system blocks of a specific size. For example, the size of a file system block may be 8 kilobytes (KB). As the data storage system is initialized, some of the pages are reserved for use by the operating system, some pages are designated as 'free' for allocation to other applications, and a large chunk of pages are reserved to provide a buffer cache (also referred to as "buffer cache pool"). The buffer cache temporarily stores pages in a volatile memory of a data storage system that are also stored in an attached disk device to increase application performance.

File systems typically include metadata describing attributes of a file system and data from a user of the file system. A file system contains a range of file system blocks that store metadata and data. A user of a file system access the file system using a logical address (a relative offset in a file) and the file system converts the logical address to a physical address of a disk storage that stores the file system. Further, a user of a data storage system creates one or more files in a file system. Every file includes an index node (also referred to simply as "inode") that contains the metadata (such as permissions, ownerships, timestamps) about that file. The contents of a file are stored in a collection of data blocks. An inode of a file defines an address map that converts a logical address of the file to a physical address of the file. Further, in order to create the address map, the inode includes direct data block pointers and indirect block pointers. A data block pointer points to a data block of a file system that contains user data. An indirect block pointer points to an indirect block that contains an array of block pointers (to either other indirect blocks or to data blocks). There may be many levels of indirect blocks arranged in a hierarchy depending upon the size of a file where each level of indirect blocks includes pointers to indirect blocks at the next lower level.

A file may be replicated by using a snapshot copy facility that creates one or more replicas (also referred to as "snapshot copies") of the file. A replica of a file is a point-in-time copy of the file. Further, each replica of a file is represented by a version file that includes an inheritance mechanism enabling metadata (e.g., indirect blocks) and data (e.g., direct data blocks) of the file to be shared across one or more versions of the file. Snapshot copies are in widespread use for on-line data backup. If a file becomes corrupted, the file is restored with its most recent snapshot copy that has not been corrupted.

Although existing various methods provide reasonable means of writing data to file systems stored to a persistent storage, providing access to data of file systems and creating a replica of file systems, they also come with a number of challenges, especially when efficiently deleting a snapshot copy of a file of a file system. It may be difficult or impossible for the conventional snapshot copy facility to efficiently delete a snapshot copy of a file of a file system.

SUMMARY OF THE INVENTION

A method is used in managing deletion of replicas of files. A request is received to delete a replica of a file of a file system. The replica of the file represents a state of the file at a particular prior point in time. The replica is associated with a group including a set of replicas of the file system identified for deletion. Each replica is deleted in the group concurrently by using a delete marker. The delete marker is used for tracking deletion of each replica in the group.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
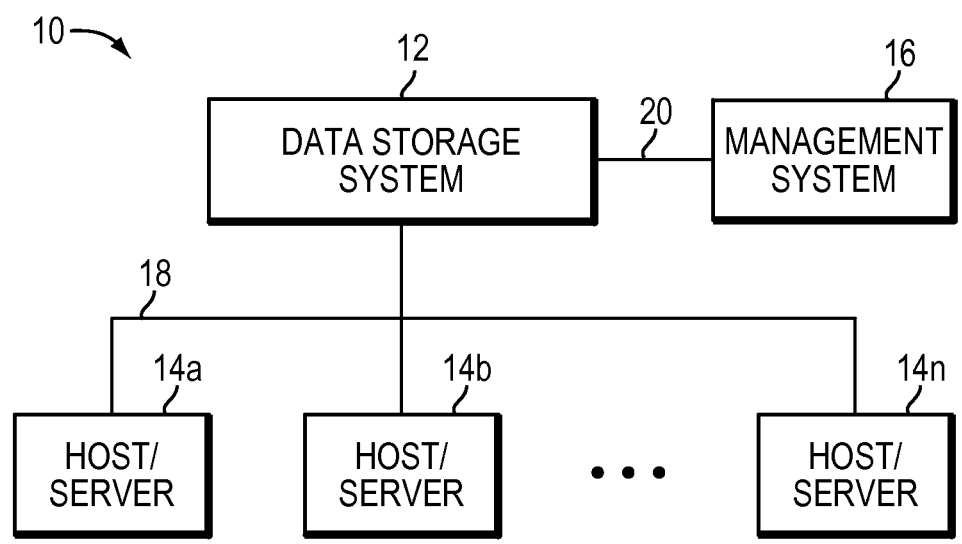
FIGS. 1-2 are examples of an embodiment of a computer system that may utilize the techniques described herein.

Described below is a technique for use in managing deletion of replicas of files, which technique may be used to provide, among other things, receiving a request to delete a replica of a file of a file system, where the replica of the file represents a state of the file at a particular prior point in time, associating the replica with a group including a set of replicas of the file system identified for deletion, and deleting each replica in the group concurrently by using a delete marker, where the delete marker is used for tracking deletion of each replica in the group.

Generally, a storage extent is a logical contiguous area of storage reserved for a user requesting the storage space. A storage extent may include a set of disks having different RAID levels. A disk may be a physical disk within the storage system. A LUN may be a logical unit number which is an identifier for a logical unit representing a portion of disk storage. Each slice of data may have a mapping to the location of the physical drive where it starts and ends. A LUN presented to a host system may be organized as a file system by a file system mapping logic of a storage system.

A file is uniquely identified by a file system identification number. Each data block of a file is referenced by a logical block number and/or file system block number. A logical block number of a file refers to a data block by relative position of the data block inside the file. A file system block number of a file refers to a data block by relative position of the data block on a physical disk device on which the file is stored. A file system block number for a data block is computed based on a file offset and the size of the data block. Further, an inode of a file includes metadata that provides a mapping to convert a file system block number of a data block to its corresponding logical block number. For example, in case of a data block size of 4 kilobytes (KB), if a file offset value is smaller than 4096 bytes, the file offset corresponds to the first data block of the file, which has file block number 0. Further, for example, if a file offset value is equal to or greater than 4096 bytes and less than 8192 bytes, the file offset corresponds to the second data block of the file, which has file block number 1.

Generally, each file system data block of a file is associated with a respective mapping pointer. A mapping pointer of a file system block points to the file system block and includes metadata information for the file system block. A file system block associated with a mapping pointer may be a data block or an indirect block which in turn points to other data blocks or indirect blocks. A mapping pointer includes information that help map a logical offset of a file system block to a corresponding physical block address of the file system block.

Further, a mapping pointer of a file system block includes metadata information for the file system block such as a weight that indicates a delegated reference count for the mapping pointer. The delegated reference count is used by a snapshot copy facility when a replica of a file is created. Mapping pointers of the inode of the file are copied and included in the inode of the replica of the file. Mapping pointers of the inode may include mapping pointers pointing to direct data blocks and mapping pointers pointing to indirect blocks. The delegated reference count values stored in the mapping pointers of the file and the replica of the file are updated to indicate that the file and the replica of the file share data blocks of the file.

The delegated reference counting mechanism is described in U.S. Pat. No. 8,032,498 for "Delegated reference count base file versioning" issued Oct. 4, 2011, which is incorporated herein by reference.

Further, the delegated reference counting mechanism is also used by a deduplication facility for performing deduplication on a set of identical data blocks by sharing the set of identical data blocks and keeping a single copy of data block such that other identical data blocks point to the single copy of the data block.

Thus, a delegated reference count is a way of maintaining block ownership information for indicating whether or not each indirect block or data block of a file is shared with another version of the file or another identical data block. Further, as introduced above, files are organized as a hierarchy of file system blocks including inodes, indirect blocks, and data blocks. The hierarchy of file system blocks includes a parent-child block relationship between a parent object that points to a child object. For example, if the mapping pointer of the inode of a file points to a data block, the association between the mapping pointer of the inode and the data block may be viewed as a parent-child block relationship. Similarly, for example, if the mapping pointer of an indirect block of a file points to a data block, the association between the mapping pointer of the indirect block and the data block may be viewed as a parent-child block relationship. Block ownership information is maintained by storing respective reference counts for the file system indirect blocks and file system data blocks in the file system block hierarchy, and by storing respective delegated reference counts for the parent-child block relationships in the file system block hierarchy. For each parent-child block relationship, a comparison of the respective delegated reference count for the parent-child relationship to the reference count for the child block indicates whether or not the child block is either shared among parent blocks or has a single, exclusive parent block. For example, if the respective delegated reference count is equal to the respective reference count, then the child block is not shared, and the parent block is the exclusive parent of the child block. Otherwise, if the respective delegated reference count is not equal to the respective reference count, then the child block is shared among parent blocks.

Further, when a sharing relationship of a file system block is broken, the reference count in the per-block metadata of the file system block is decremented by the delegated reference count associated with mapping pointer of the file system block.

A snapshot (also referred to herein as "replica", "checkpoint", and "snap") is a point-in-time copy of data (e.g., a production file). Generally, storage applications use snapshots to protect production data and ensure consistency of the production data. Generally, snapshots of data are created at a regular time interval (e.g., 10 minutes, 1 hour). Further, a snapshot of a production data may become obsolete when new snapshots of the production data are created. Each snapshot of data has a unique identification. An old snapshot may be refreshed by reusing identification of the old snapshot. When an old snapshot is deleted, storage space allocated to the old snapshot is reclaimed and metadata associated with the old snapshot is updated appropriately. A set of replicas of a file (also referred to herein as "working file" or "primary file") may be logically organized together in a version set. A version set indicates a family of snapshot copies.

Typically, a file delete operation deletes a file of a file system in a storage system. When a file is deleted, each file system block of the file is deleted and marked as a free file system block. Further, a file may be truncated by deleting a portion of the file. During a file truncate operation, each file system block that is a part of a portion of the file which is being truncated is deleted. When a file system block is deleted, a parent file system block which includes a mapping pointer pointing to the file system block is updated to indicate that the mapping pointer no longer points to the file system block. By updating the mapping pointer in such a way creates a hole such that the mapping pointer is marked as unused indicating that the mapping pointer no longer points to any file system block. Thus, upon receiving a request to delete a file or a portion of the file, a file system hierarchy of the file or the portion of the file is iterated to free each file system block of the file system hierarchy of the file or the portion of the file. An indirect block at the lowest level of a file system hierarchy of a file is known as a leaf indirect block. Each leaf indirect block of the file system hierarchy of a file or a portion of the file is processed for deleting data blocks pointed to by each leaf indirect block. It should be noted that a file delete or file truncate operation may either be executed on a primary file or any replica of the primary file.

Further, a file system block is deleted based on the ownership status of the file system block. Thus, a delete operation on a file system block decrements the reference count in the per-block metadata of a child block by a full weight or a partial weight depending on whether or not the deleted file system block did not share the child block or did share the child block.

Further, if a file system block is not shared but owned by a parent file system block which points to the file system block, the owned file system block is deleted by freeing the file system block. Further, when a file system block of a file of a file system is deleted, metadata such as superblock of the file, the size of the file, and a mapping pointer in a parent file system block pointing to the file system block is updated to indicate that the file system block is a free file system block which may be reused. Further, after updating metadata of a file system block of a file upon receiving a request to delete the file system block, a metadata transaction entry is created and stored in a journal such as a file system transaction log. Further, when a shared file system block is deleted by returning a weight for the shared file system block, a metadata transaction entry created in such a case indicates a return weight transaction. Moreover, when a file system block owned by a parent file system block is deleted by freeing the file system block, a metadata transaction entry created in such a case indicates a free block transaction.

Conventionally, if multiple snaps are either deleted or refreshed, receiving a new request to delete a new snap is not managed efficiently as a data storage system is unable to efficiently aggregate the new snap identified for deletion with the multiple snaps already being deleted. Thus, in such a conventional system, it is difficult or impossible to aggregate a new request received to delete a snap with a deletion process that has been on going in a storage system. Further, in such a conventional system, a data storage system continuously receives requests to delete snaps causing the data storage system to consume a large amount of time by handling deletion of each snap delete request as and when it arrives without efficiently aggregating the requests to delete the snaps with existing delete operations that are being performed on a set of snaps. Thus, a goal of the current invention is to efficiently aggregate multiple snaps for efficient and fast deletion of the multiple snaps in order to increase performance of a system by performing less number of I/O operations and consuming less storage resources (e.g., CPU and cache) of the system.

By contrast, in at least some implementations in accordance with the technique as described herein, the current technique optimizes file truncate and file delete operations by creating a delete group of snaps selected for deletion for each version set of a file system to track progress of deletion of snaps of the file system. Further, in at least one embodiment of the current technique, logical address space of snaps included in a delete group is apportioned into pre-defined chunks and a delete mark is used to track progress of deletion of the snaps as each chunk is deleted concurrently. Further, in at least one embodiment of current technique, deletion of each snap of a file system is started from the last block (also referred to herein in "end-of-file position") of the file system.

In at least some implementations in accordance with the technique as described herein, the use of the managing deletion of replicas in files technique can provide one or more of the following advantages: improving the amount of time it takes to delete snaps by enabling a storage system to add a snap identified for deletion to a set of snaps that are being deleted without causing any delay or interruption to the set of snaps already being deleted, improving I/O performance of a system by reducing the number of I/Os generated during a file delete and file truncate operations, improving host I/O performance by efficiently deleting or truncating a file and/or replica by reducing the number of metadata transactions and the number of times metadata is retrieved from a storage device, improving performance of snap delete operations by efficiently using storage resources (e.g., CPU and cache) of a system, and efficiently updating and flushing metadata entries to a journal (e.g., a transaction log).

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or SAN through fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an ATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like.

In certain cases, an enterprise can utilize different types of storage systems to form a complete data storage environment. In one arrangement, the enterprise can utilize both a block based storage system and a file based storage hardware, such as a VNX™ or VNXe™ system (produced by EMC Corporation, Hopkinton, Mass.). In such an arrangement, typically the file based storage hardware operates as a front-end to the block based storage system such that the file based storage hardware and the block based storage system form a unified storage system.

Figure 2:
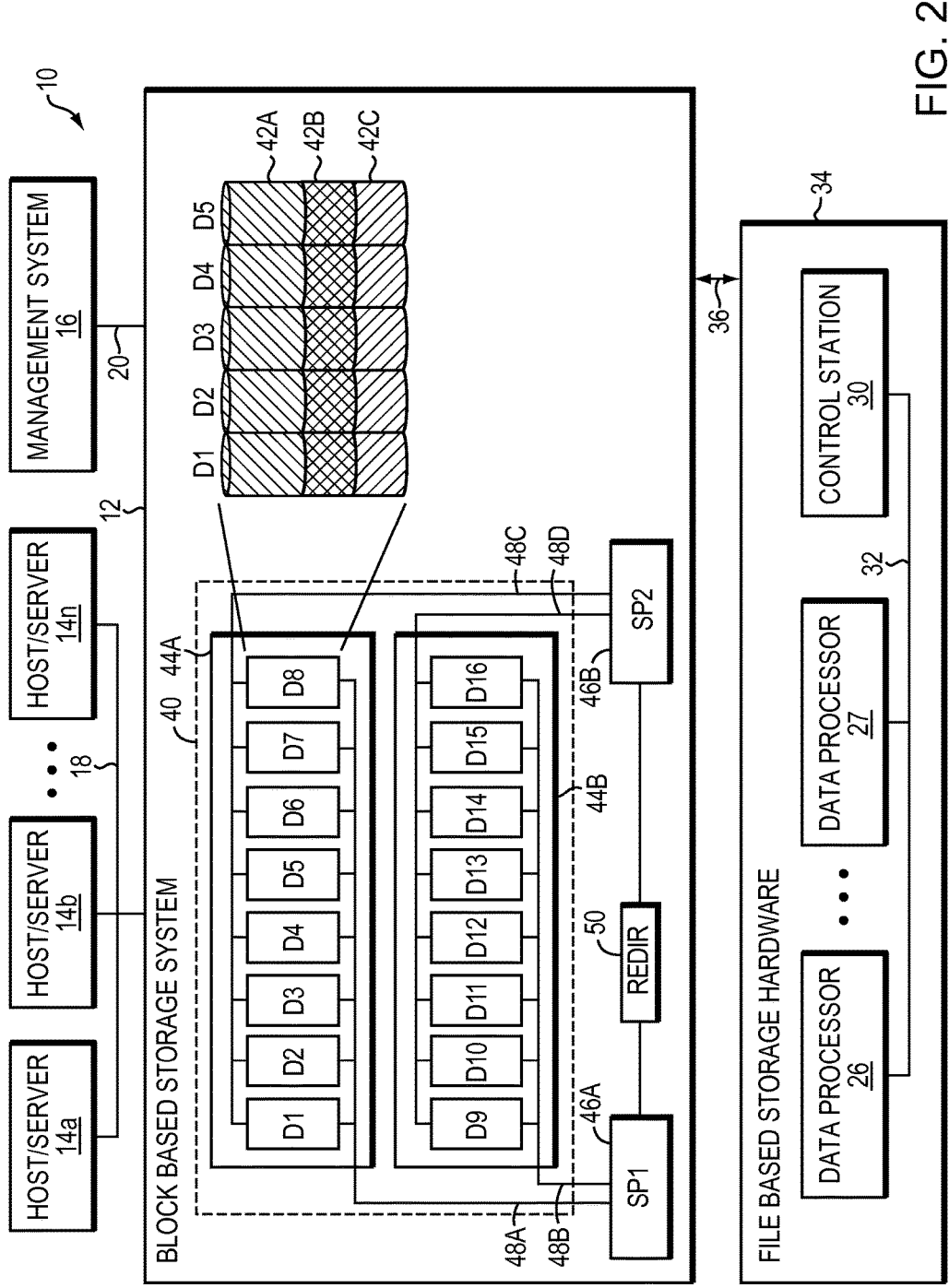

Referring now to FIG. 2, shown is an example of an embodiment of a computer system such as a unified data storage system that may be used in connection with performing the technique or techniques described herein. As shown, the unified data storage system 10 includes a block based storage system 12 and file based storage hardware 34. While the block based storage system 12 may be configured in a variety of ways, in at least one embodiment, the block based storage system 12 is configured as a storage area network (SAN), such as a VNX™ or VNXe™ system, as produced by EMC Corporation of Hopkinton, Mass. While the file based storage hardware 34 may be configured in a variety of ways, in at least one embodiment, the file based storage hardware 34 is configured as a network attached storage (NAS) system, such as a file server system produced by EMC Corporation of Hopkinton, Mass., configured as a header to the block based storage system 12.

The computer system 10 includes one or more block based data storage systems 12 connected to host systems 14a-14n through communication medium 18. The system 10 also includes a management system 16 connected to one or more block based data storage systems 12 through communication medium 20. In this embodiment of the computer system 10, the management system 16, and the N servers or hosts 14a-14n may access the block based data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the block based data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

In at least one embodiment of the current technique, block based data storage system 12 includes multiple storage devices 40, which are typically hard disk drives, but which may be tape drives, flash memory, flash drives, other solid state drives, or some combination of the above. In at least one embodiment, the storage devices may be organized into multiple shelves 44, each shelf containing multiple devices. In the embodiment illustrated in FIG. 2, block based data storage system 12 includes two shelves, Shelf1 44A and Shelf2 44B; Shelf1 44A contains eight storage devices, D1-D8, and Shelf2 also contains eight storage devices, D9-D16.

Block based data storage system 12 may include one or more storage processors 46, for handling input/output (I/O) requests and allocations. Each storage processor 46 may communicate with storage devices 40 through one or more data buses 48. In at least one embodiment, block based data storage system 12 contains two storage processors, SP1 46A, and SP2 46B, and each storage processor 46 has a dedicated data bus 48 for each shelf 44. For example, SP1 46A is connected to each storage device 40 on Shelf1 44A via a first data bus 48A and to each storage device 40 on Shelf2 44B via a second data bus 48B. SP2 46B is connected to each storage device 40 on Shelf1 44A via a third data bus 48C and to each storage device 40 on Shelf2 44B via a fourth data bus 48D. In this manner, each device 40 is configured to be connected to two separate data buses 48, one to each storage processor 46. For example, storage devices D1-D8 may be connected to data buses 48A and 48C, while storage devices D9-D16 may be connected to data buses 48B and 48D. Thus, each device 40 is connected via some data bus to both SP1 46A and SP2 46B. The configuration of block based data storage system 12, as illustrated in FIG. 2, is for illustrative purposes only, and is not considered a limitation of the current technique described herein. Thus, it should be noted that data storage system 12 may include any number of storage processors.

In addition to the physical configuration, storage devices 40 may also be logically configured. For example, multiple storage devices 40 may be organized into redundant array of inexpensive disks (RAID) groups. Although RAID groups are composed of multiple storage devices, a RAID group may be conceptually treated as if it were a single storage device. As used herein, the term "storage entity" may refer to either a single storage device or a RAID group operating as a single storage device.

Storage entities may be further sub-divided into logical units. A single RAID group or individual storage device may contain one or more logical units. Each logical unit may be further subdivided into portions of a logical unit, referred to as "slices". In the embodiment illustrated in FIG. 2, storage devices D1-D5, is sub-divided into 3 logical units, LU1 42A, LU2 42B, and LU3 42C. The LUs 42 may be configured to store a data file as a set of blocks striped across the LUs 42.

The unified data storage system 10 includes a file based storage hardware 34 that includes at least one data processor 26. The data processor 26, for example, may be a commodity computer. The data processor 26 sends storage access requests through physical data link 36 between the data processor 26 and the block based storage system 12. The data link 36 may be any one or more of a variety of networks or other type of communication connections as known to those skilled in the art. The processor included in the data processor 26 may be any one of a variety of proprietary or commercially available single or multiprocessor system, such as an Intel-based processor, or other type of commercially available processor able to support traffic in accordance with each particular embodiment and application. Further, file based storage hardware 34 may further include control station 30 and additional data processors (such as data processor 27) sharing storage device 40. A dual-redundant data link 32 interconnects the data processors 26, 27 to the control station 30. The control station 30 monitors a heartbeat signal from each of the data processors 26, 27 in order to detect a data processor failure. If a failed data processor cannot be successfully re-booted, the control station 30 will "fence off" the failed data processor and re-assign or fail-over the data processing responsibilities of the failed data processor to another data processor of the file based storage hardware 34. The control station 30 also provides certain server configuration information to the data processors 26, 27. For example, the control station maintains a boot configuration file accessed by each data processor 26, 27 when the data processor is reset.

The data processor 26 is configured as one or more computerized devices, such as file servers, that provide end user devices (not shown) with networked access (e.g., NFS and CIFS facilities) to storage of the block based storage system 12. In at least one embodiment, the control station 30 is a computerized device having a controller, such as a memory and one or more processors. The control station 30 is configured to provide hardware and file system management, configuration, and maintenance capabilities to the data storage system 10. The control station 30 includes boot strap operating instructions, either as stored on a local storage device or as part of the controller that, when executed by the controller following connection of the data processor 26 to the block based storage system 12, causes the control station 30 to detect the automated nature of a file based storage hardware installation process and access the data processor 26 over a private internal management network and execute the file based hardware installation process.

Figure 3:
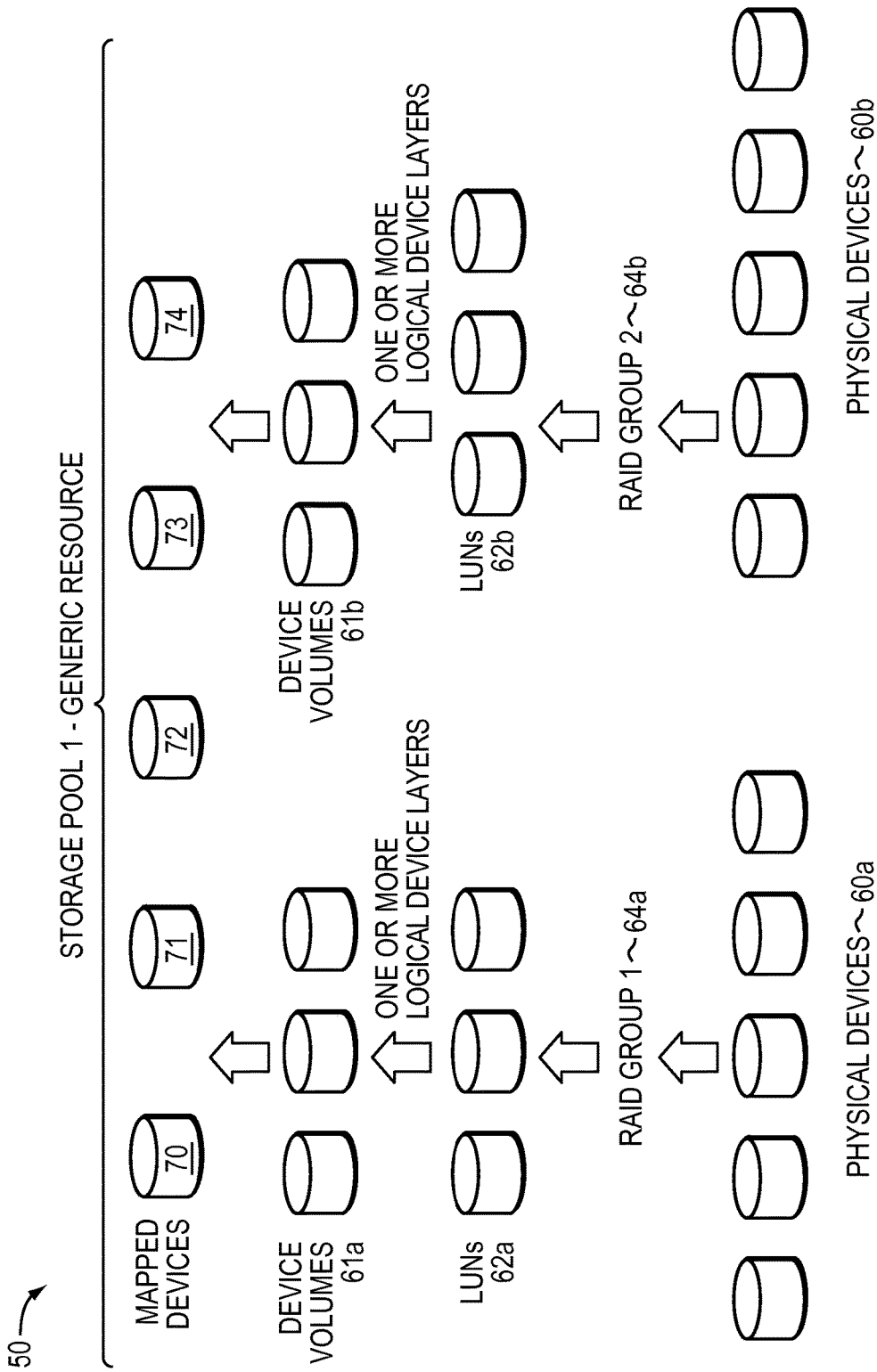
FIG. 3 is an example illustrating storage device layout.

FIG. 3 illustrates one of the many ways of constructing storage extents from a group of physical devices. For example, RAID Group 64 may be formed from physical disk devices 60. The data storage system best practices of a policy may specify the particular RAID level and configuration for the type of storage extent being formed. The RAID Group 64 may provide a number of data storage LUNs 62. An embodiment may also utilize one or more additional logical device layers on top of the LUNs 62 to form one or more logical device volumes 61. The particular additional logical device layers used, if any, may vary with the data storage system. It should be noted that there may not be a 1-1 correspondence between the LUNs of 62 and the volumes of 61. In a similar manner, device volumes 61 may be formed or configured from physical disk devices 60. Device volumes 61, LUNs 62 and physical disk devices 60 may be configured to store one or more blocks of data or one or more files organized as a file system. A storage extent may be formed or configured from one or more LUNs 62.

The data storage system 12 may also include one or more mapped devices 70-74. A mapped device (e.g., "thin logical unit", "direct logical unit") presents a logical storage space to one or more applications running on a host where different portions of the logical storage space may or may not have corresponding physical storage space associated therewith. However, the "thin logical unit" ("TLU") mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the "thin logical unit" ("TLU") mapped device results in either a null pointer (or equivalent) indicating that no corresponding physical storage space has yet been allocated, or results in a reference to a data device which in turn references the underlying physical storage space.

A user of data storage system 12 accesses data from LUNs stored on disk drives 60 in fixed sized chunks. Each fixed size chunk is known as a slice. One or more slices are grouped together to create a slice pool. Host system 14 provisions storage from slice pools for creating LUNs. A LUN is visible to host system 14 and a user of a data storage system 12. Typically, storage is allocated when host system 14 issues a write request and needs a data block to write user's data.

Figure 4:
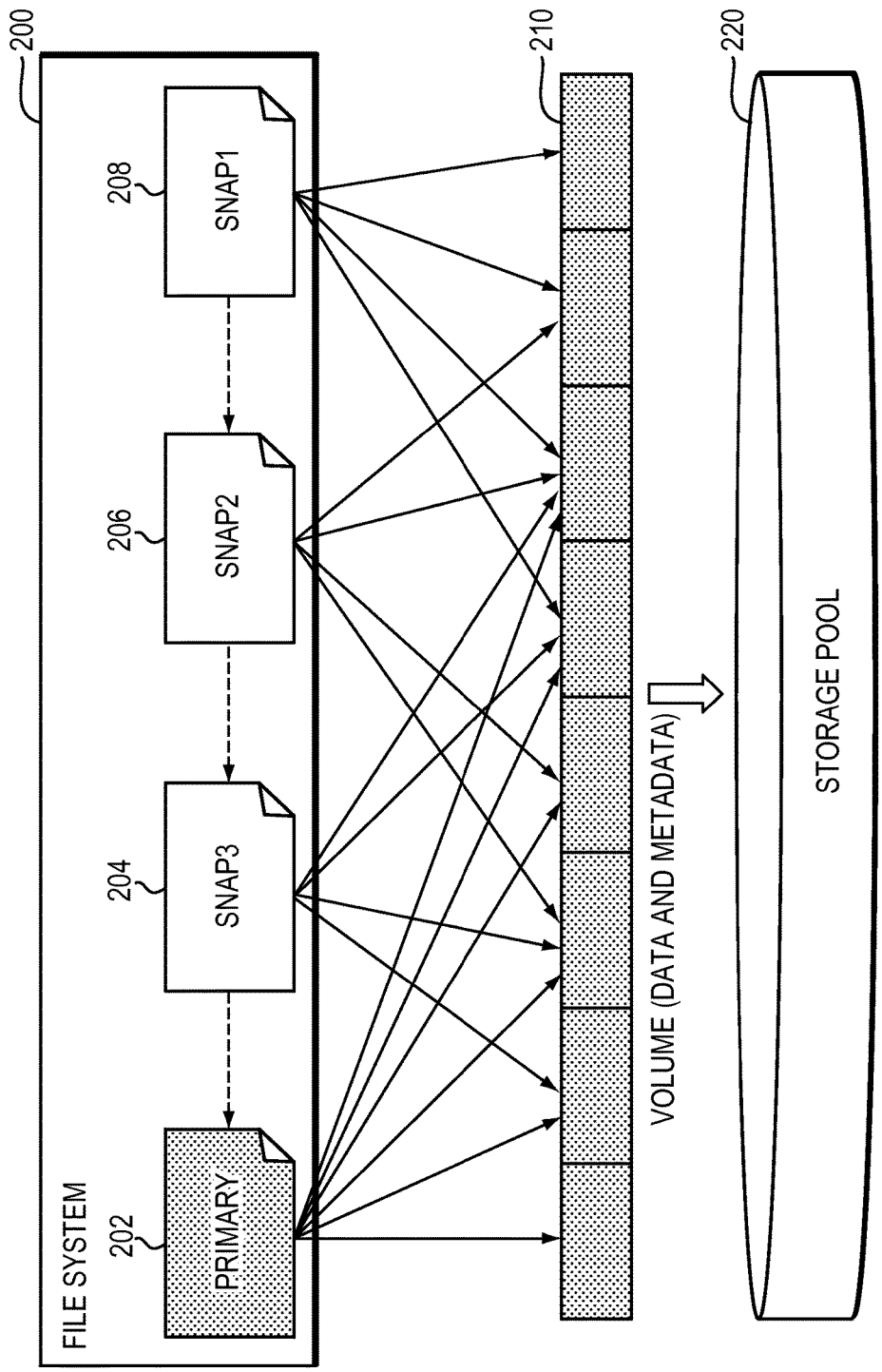
FIGS. 4-9 are diagrams illustrating in more detail components that may be used in connection with techniques herein.

Referring to FIG. 4, shown is a more detailed representation of components that may be included in an embodiment using the techniques described herein. FIG. 4 shows a file system 200 including a primary file 202 and a set of snaps (e.g., snap-3 204, snap-2 206, snap-1 208) created for the primary file 202 where each snap of the set of snaps indicates a point-in-time view of the primary file 202. The primary file 202 and the set of snaps for the primary file resides in the same storage pool 220 because the primary file 202 and the set of snaps shares a large portion of data blocks. Further, a portion of data and metadata blocks shared between the primary file 202 and the set of snaps of the primary file 202 may reside on the same volume 210 allocated from the storage pool 220. However, the primary file 202 and the set of snaps of the primary file 202 may include data and/or metadata that may not be shared and results from updates made to the primary file 202 and the set of snaps of the primary file 202. A snap delete is a process that deletes file system blocks included in a file system hierarchy of a snap of a storage object such as a file by de-allocating the file system blocks. It should be noted that the term "snap delete", "replica delete", "file delete", and "file truncate" may be used herein interchangeably.

When a snapshot copy of a file is deleted, a portion of the file is truncated, or a portion of a snapshot copy of the file is truncated, each indirect block in a file system block hierarchy corresponding to a portion of a file or a snapshot copy of the file which is being deleted or truncated is evaluated such that a sibling indirect data block is determined for each indirect data block from file system hierarchies of snapshot copies of the file included in a version set to which the file belongs such that the indirect data block and the sibling indirect data block shares the most data blocks compared to other indirect data blocks in the file system hierarchies. Upon finding a sibling indirect data block for an indirect data block that has been selected for deletion, reference count for each shared data block pointed to by the indirect data block is returned to corresponding shared data block mapping pointer included in the sibling indirect data block instead of updating per-block metadata of each shared data block. It should be noted that an indirect data block may be selected from a file system hierarchy of a file when the file is deleted, the file is truncated, zeros are written to a portion of the file (also referred to as "punching a hole"), or data blocks are freed and returned to a storage device. Returning weight value for each shared data block pointed to by an indirect data block of a file to reference count values in a sibling indirect data block may also be referred to as "reverse indirect block split" operation as it operates in an opposite manner to a write split operation described above herein.

Conventionally, when a set of snaps are identified for deletion, weight of each indirect block of each snap is returned to a sibling indirect block in such a way that the operation of returning weight is repeated as many times as there are numbers of indirect blocks in each snap. By contrast, in at least one embodiment of the current technique, multiple snaps identified for deletion are aggregated together in such a way that weights for indirect blocks of each snap is returned to respective sibling indirect blocks in a single operation thereby reducing the amount of storage resources such as CPU consumed in a storage system and reducing the load on I/Os being performed in the storage system.

Figure 5:
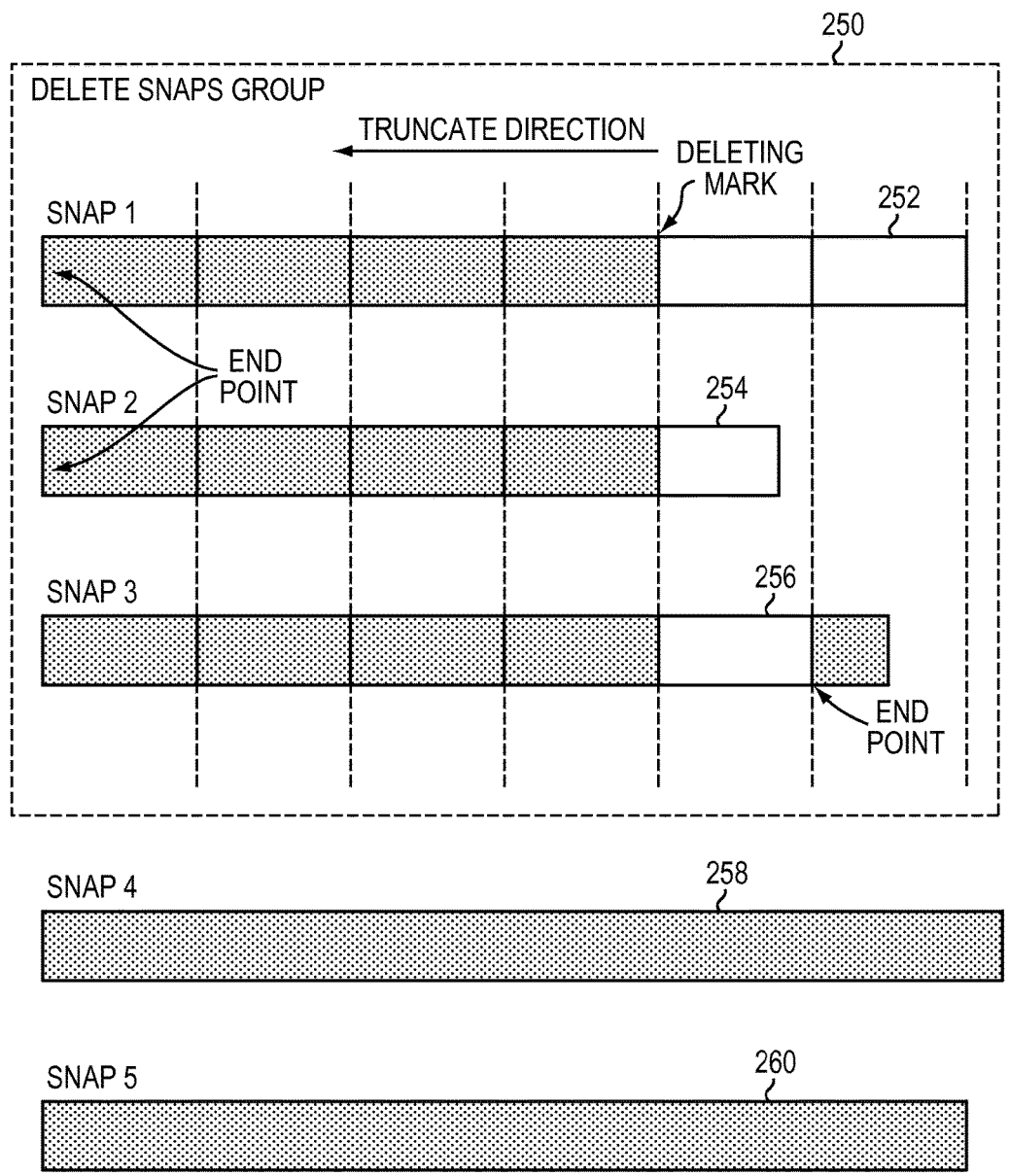

Referring to FIG. 5, shown is a more detailed representation of components that may be included in an embodiment using the techniques described herein. In at least one embodiment of the current technique, upon receiving a request to delete a set of snaps of a storage object such as a file, a subset of the set of snaps that shares most data blocks is aggregated for deletion. In at least one embodiment of the current technique, when multiple snaps are deleted, respective file system hierarchy of the multiple snaps is traversed in such a way that data blocks residing at similar or same offset within the multiple snaps are deallocated efficiently and quickly. Thus, in at least one embodiment of the current technique, indirect data blocks residing at similar or same offsets within a set of snaps may be processed by the same thread and multiple threads may process file system data blocks residing at different offsets included in leaf indirect data blocks of such indirect data blocks concurrently thereby aggregating cache lookup operations, metadata update operations and journal update operations within the same thread.

In at least one embodiment of the current technique, upon receiving a request to delete a set of snaps of a file, a snap from the set of snaps is selected as a destination snap (also referred to herein as "leader snap"). A destination snap may be selected from a set of snaps based on the size of a snap such that the destination snap has the largest size compared to the other snaps in the set of snaps. In at least one embodiment of the current technique, a thread may start deleting a set of snaps identified for deletion such that indirect data blocks residing at the same offset within a destination snap and the set of snaps are processed and deallocated concurrently.

Generally, a storage system may be configured to create snaps of a file system periodically at a fixed time interval such as after every hour. Further, a storage system may be configured to refresh a set of snaps previously created for a file system. Thus, a set of snaps may become outdated and selected for deletion after a period of time. Further, a delete operation is performed on a snap when the snap is either refreshed or outdated. In a conventional system, it may be difficult to aggregate a set of snaps when each snap of the set of snaps is identified for deletion at a different time.

In at least one embodiment of the current technique, for example, as illustrated in FIG. 5, a set of snaps (e.g., snap-1 252, snap-2 254, snap-3 256) selected for deletion are aggregated together in a delete group 250. A delete group is a logical group of a set of snaps identified for deletion such that each snap of the set of snaps in the delete group is associated with the same version set of a file system. Further, additional snaps that are selected for deletion may be added to the delete group at a later time. Further, a snap added to a delete group may be removed from the delete group when the snap is truncated. In at least one embodiment of the current technique, a delete mark is used to indicate current progress of deletion in a delete group. Further, a delete mark may be used to synchronize deletion of additional snaps that are added to the delete group at a later time. Each snap added to a delete group uses the same delete mark indicating that each snap is deleted at same or similar pace. Further, information such as an endpoint may be used to indicate location of the last block of a snap file that is required to be deleted when the snap file added to a delete group is completely truncated. So, for example, if deletion of a snap starts from the tail of the snap, the endpoint is set to the first block of the snap. Similarly, if deletion of a snap starts from the head of the snap, the endpoint is set to the last block of the snap. Further, a separate endpoint is used for each snap file included in a delete group. Further, when an endpoint for a snap reaches the position within the snap which is same as the position indicated by a delete mark for a delete group in which the snap is included, the snap file is deleted completely.

Further, in at least one embodiment of the current technique, a snap having a largest size among a set of snaps included in a delete group is selected as a leader snap when the set of snaps are identified for deletion and added to the delete group. Further, in such case, a delete mark is updated to point to the end of the address space of a leader snap when a delete operation starts deleting a set of snaps added to a delete group in such a way that the delete operation first deletes the last block of each snap of the set of snaps. Further, when a snap file identified as a leader snap is deleted and removed from a delete group, a new leader snap is identified and selected from snaps remaining in the delete group such that the new leader snap has the largest size compared to the remaining snaps in the delete group. Further, in such a case, a delete process (also referred to herein as "truncate process") starts deleting each snap remaining in a delete group during the next iteration by starting from the last block of the new leader snap.

Thus, as illustrated in FIG. 5, in at least one embodiment of the current technique, logical address space of each snap of the set of snaps included in the delete group 250 is apportioned into chunks such that each chunk indicates a contiguous set of file system data blocks that are processed for deletion concurrently. Further, snap-1 252 that has the largest size is selected as a leader snap. In such an example, multiple threads may be executed concurrently for de-allocating file system blocks residing in each chunk such that each chunk is processed by a single thread. Further, information such as an endpoint is maintained for each snap included in the delete group 250 to track the position of the last block of a snap that is required to be deleted at the end of a deletion process. Further, a delete operation starts deleting each snap of the delete group 250 starting from the tail end of each snap such that at the start of the delete operation, the endpoint for each snap is set to the last block of a snap file that needs to be deleted. Further, as each snap may be added to the delete group 250 at a different time, the endpoint of each snap may be different as the last block that may need to be deleted for each snap may be different. Thus, for example, endpoints for snap-1 252 and snap-2 254 is the file offset with a value of zero and the endpoint for snap-3 256 is a position within the snap-3 256 which is less than the last block indicating the end of the snap-3 256 as snap-3 256 have been added after snap-1 252 and snap-2 254 are added to the delete group 250 and have already been partially deleted.

Further, in at least one embodiment of the current technique, a new snap may be added to the delete group 250 such that the endpoint for the new snap is set to the value indicated by the current delete mark for the delete group 250 such that a delete operation starts deleting the new snap from the position within the new snap indicated by the endpoint. Further, when a delete process reaches the endpoint of a snap file, deletion of the snap file is considered complete and the snap file is removed from a delete group. For example, in FIG. 5, after the delete mark reaches the endpoints of snap-1 252 and snap-2 254, the next iteration for a delete process starts from the end of the snap-3 256 to delete blocks residing between the end-of-file position of snap-3 256 and the endpoint of the snap-3 256.

Figure 6:
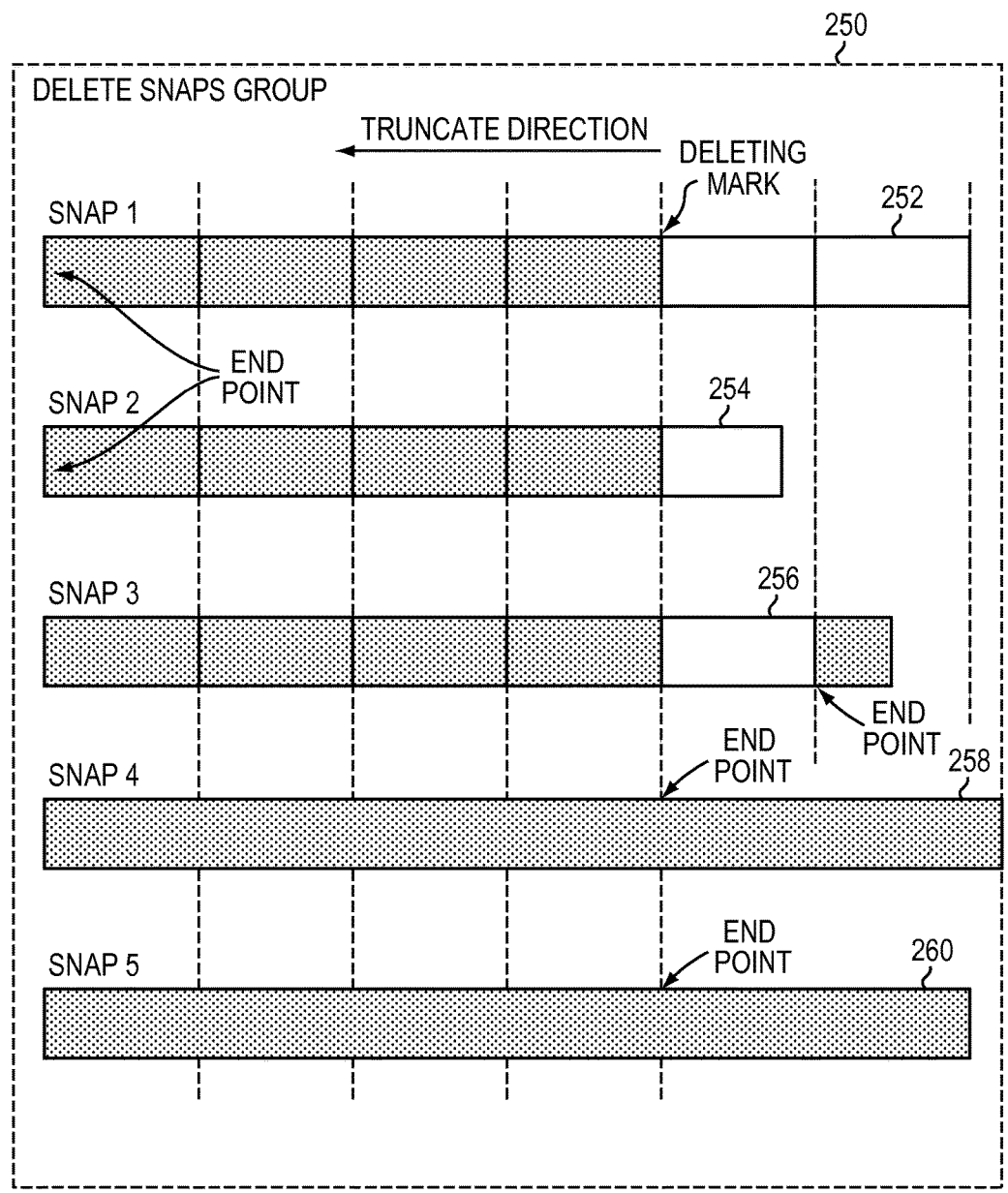

Referring to FIG. 6, shown is a more detailed representation of components that may be included in an embodiment using the techniques described herein. In at least one embodiment of the current technique, snap-4 258 and snap-5 260 are added to the existing delete group 250 during the time snap-1 252, snap-2 254, and snap-3 256 are being deleted by a file delete process. When snap-4 258 and snap-5 260 are added to the delete group 250, the respective endpoint for snap-4 258 and snap-5 260 is set to the value indicated by the current delete marker which refers to the current position at which the file delete process has deleted blocks of existing snaps so far at the point when the new snaps (snap-4, snap-5) are added.

Figure 7:
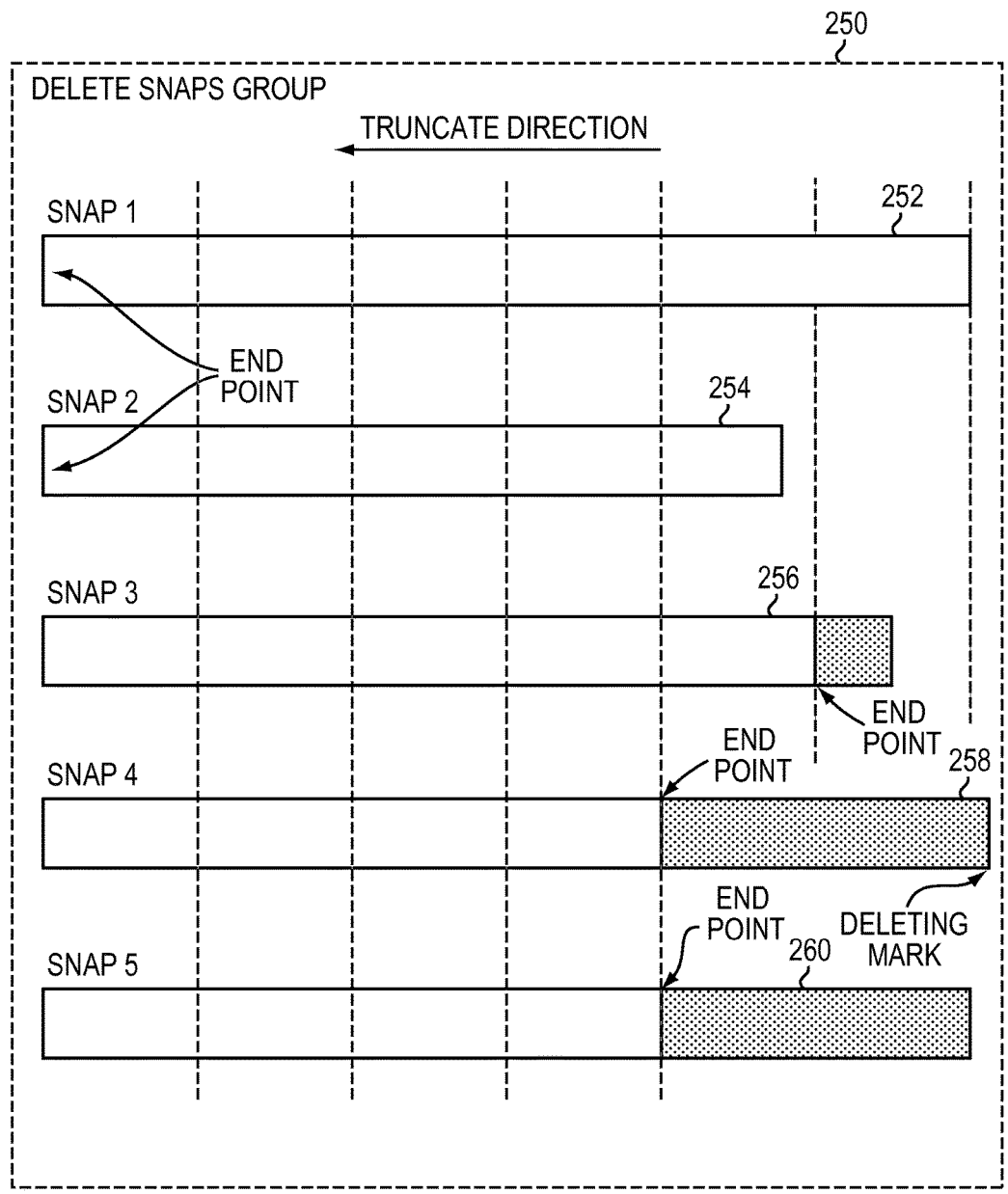

Referring to FIG. 7, shown is a more detailed representation of components that may be included in an embodiment using the techniques described herein. In at least one embodiment of the current technique, the set of snaps (snap-1 252 to snap-5 260) included in the delete group 250 are deleted concurrently in an aggregated manner described above herein such a way that the delete process starts de-allocating blocks residing at the position indicated by the delete marker and continues deleting blocks until a block indicated by the endpoint of a snap (e.g., block at the offset 0) is reached for processing. As illustrated in FIG. 7, when the delete process reaches the endpoints for snap-1 252 and snap-2 254, both the snaps are removed from the delete group and the delete mark is set to point to the end-of-file position of the largest sized snap that is left remaining in the delete group 250 for deletion. Thus, for example in FIG. 7, snap-4 258 is selected as a leader snap and the delete mark for the delete group 250 is set to point to the last block (also referred to herein as an end-of-file position) of snap-4 258. Further, respective endpoints for snap-3 256, snap-4 258, and snap-5 260 is updated to point to the last block that is required to be deleted in order to completely delete the snaps.

Figure 8:
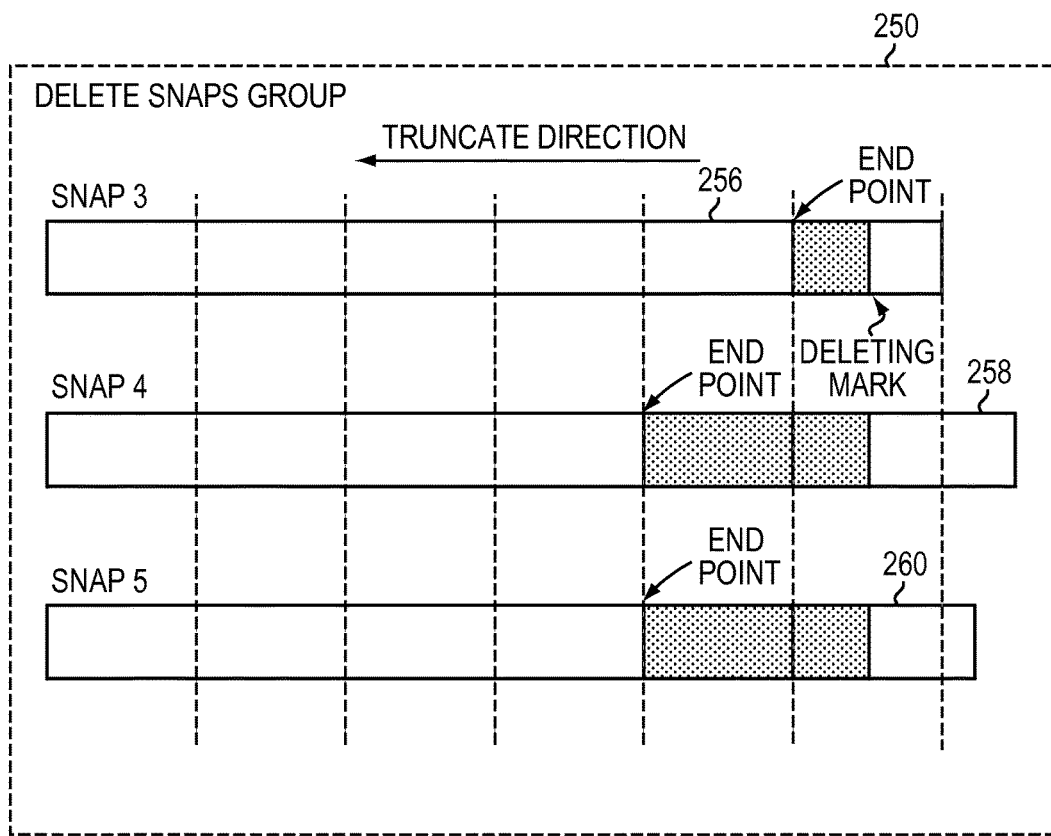

Referring to FIG. 8, shown is a more detailed representation of components that may be included in an embodiment using the techniques described herein. In at least one embodiment of the current technique, a delete process continues truncating snaps starting from blocks referred to by the current delete mark. However, it may be possible that not every snap in the delete group 250 is completely deleted when the delete mark reaches the endpoint of a specific snap. Thus, when the delete mark for a delete group reaches the endpoint of a leader snap thereby entirely de-allocating the leader snap, a new leader snap is identified and another iteration of deletion of snaps is started by updating the delete mark to point to the last block of the new leader snap.

Figure 9:
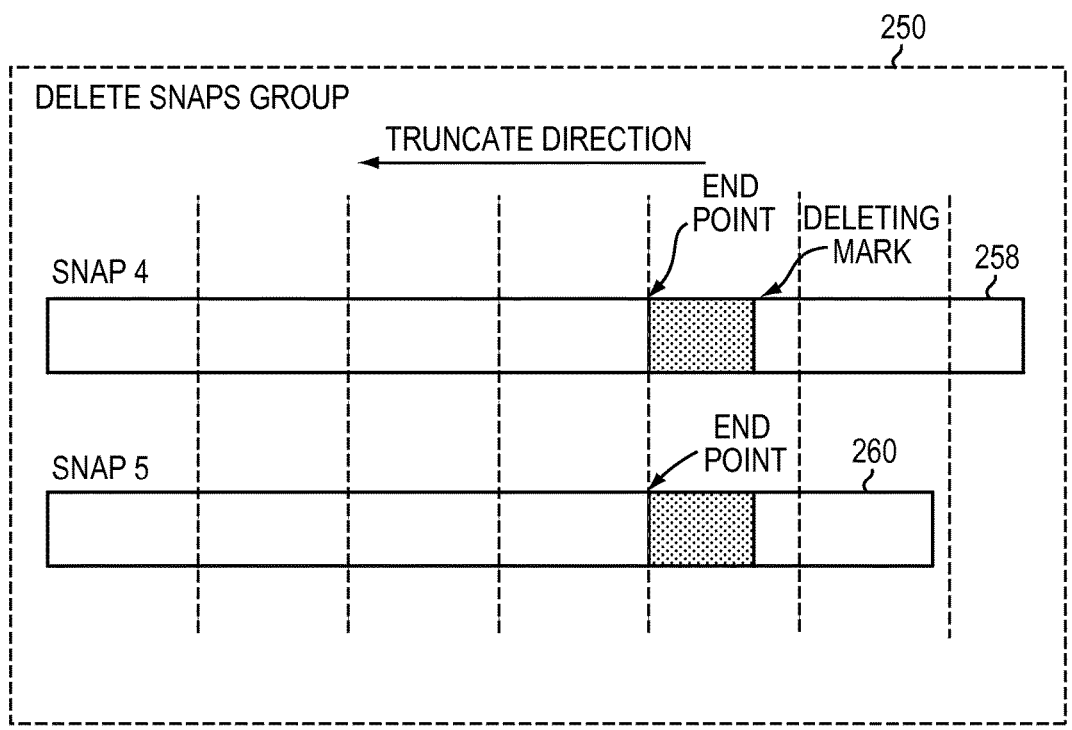

Referring to FIG. 9, shown is a more detailed representation of components that may be included in an embodiment using the techniques described herein. In at least one embodiment of the current technique, as illustrated in FIG. 9, the delete mark reaches the endpoint of the snap-3 256 thereby removing the snap-3 256 from the delete group 250. Further, the delete mark is then updated to point to the last block of snap-4 258 which is selected as the next leader snap and the delete process continues de-allocating blocks of snap-4 258 and snap-5 260 until the delete mark reaches the endpoints of both snaps. Thus, snap-4 258 and snap-5 260 are removed from the delete group 250 when every block of the snaps is deleted. Further, in at least one embodiment of the current technique, a new snap that has been identified for deletion may be added to the delete 250 group at any time without causing any interruptions to the on-going delete process or creating any delays for on-going deletion of snaps.

Figure 10:
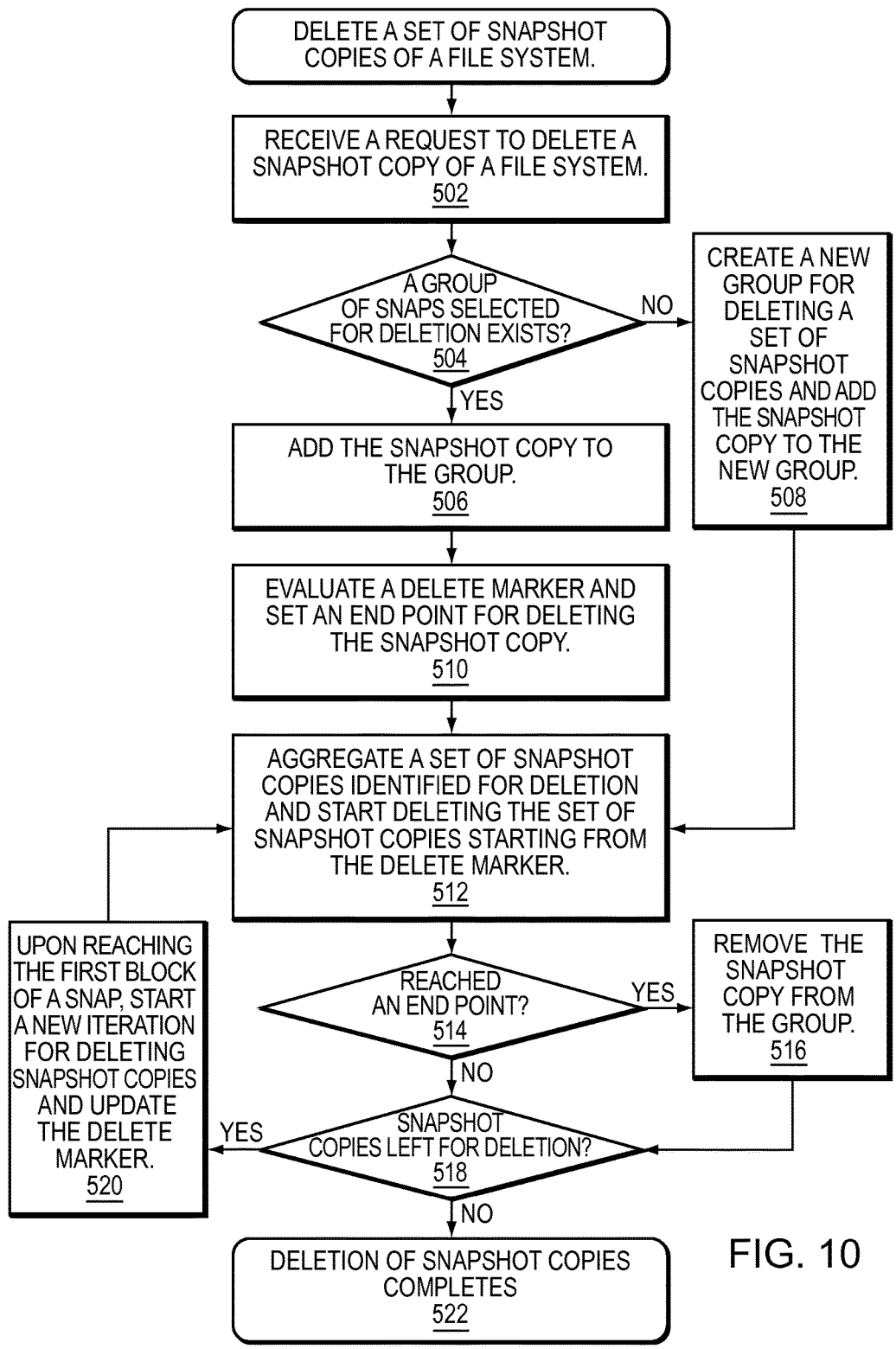
FIG. 10 is a flow diagram illustrating processes that may be used in connection with techniques herein.

Referring to FIG. 10, shown is a flow diagram illustrating a flow of data in the data storage system. With reference also to FIGS. 1-9, in at least one embodiment of the current technique, deletion of a set of snaps of a file system is managed. In at least one embodiment of the current technique, a new snap of a file system may be identified for deletion either by a user or a snap scheduler process that manages snapshot copies of the file system (step 502). It should be noted that multiple snaps may be identified for deletion. A determination is made as to whether a delete group including a set of snaps already exists (step 504). Further, a version set for a file system may be associated with a single delete group. Upon determination that a delete group already exists for the file system, the new snap identified for deletion is added to the delete group (step 506). Further, the current position of a delete mark of the delete group is evaluated and the endpoint for the new snap is set to an offset within the new snap based on the value of the current position of the delete mark provided the delete mark does not exceed the file size of the new snap (step 510). As a result, blocks of the new snap residing between the positions indicated by the delete mark and the end of the snap file are processed during the next iteration of a delete process. However, if the current position of the delete mark exceeds the file size of the new snap, the endpoint of the new snap may either be set to point to file block at the offset 0 or a new thread may be started to truncate the new snap.

However, upon determination that a delete group does not exists for a version set of the file system, a new delete group is created and the new snap identified for deletion is added to the newly created delete group (step 508). When the new snap is added either to an existing delete group or a newly created delete group, a set of snaps included in the delete group are truncated in an aggregated manner starting from the position indicated by the delete mark (step 512).

The mechanism of deleting a set of snaps in an aggregated manner is described in U.S. patent application Ser. No. 14/581,750 for "Managing Deletion of Replicas of Files" filed on Dec. 23, 2014, which is incorporated herein by reference.

In at least one embodiment of the current technique, as the delete process continues deleting blocks of the set of snaps included in the delete group, the delete mark is updated accordingly. Further, a determination is made as to whether the delete mark has reached the endpoint of any snap included in the delete group (step 514). Upon determining that the delete mark has reached the endpoint of a specific snap, the specific snap is removed from the delete group indicating that the specific snap has been completed deleted (step 516). However, upon determining that the delete mark has not reached the endpoint of a specific snap, a determination is made as to whether any snap files are left remaining in the delete group for deletion (step 518). Upon determining that the delete group is not empty and includes a set of snaps that remains for deletion, a determination is made as to whether the delete mark has reached the first block of a snap. Upon determining that the delete mark has reached the first block of a specific snap, the delete mark is updated to point to the last block of a new leader snap identified from the remaining snaps in the delete group based on the size of each remaining snap (step 520). For example, a snap having the largest size among a set of snaps may be selected as a new leader snap. The remaining snaps in the delete group are deleted in an aggregated manner as described above herein as a part of the next iteration of the delete process starting from the new position indicated by the delete mark. The delete process continues deleting remaining snaps of the delete group until each snap is deleted and the delete group no longer includes any snap of the file system for deletion.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method, executed by one or more processors, for use in managing deletion of replicas of files, the method comprising:

receiving a request to delete a set of replicas of a file of a file system, wherein a replica of a file represents a state of the file at a particular prior point in time;

aggregating a subset of the set of replicas into a group, wherein the group includes replicas of the file system identified for deletion, wherein the subset of the set of replicas shares a set of data blocks with each other, wherein each replica in the group is associated with the same version set of the file system;

apportioning logical address space of the subset of the set of replicas aggregated in the group into a set of chunks, wherein each chunk of the set of chunks reside at similar offset within the subset of the set of replicas in comparison with other chunks of the set of chunks, wherein each chunk indicates a contiguous set of data blocks that are processed for deletion concurrently; and deleting each replica in the group concurrently by using a delete marker, wherein the delete marker is used for tracking progress of deletion of each replica in the group as respective chunk of each replica in the group is deleted concurrently, wherein each replica is associated with an endpoint corresponding to a position of the last data block of each replica that is required to be deleted, wherein and initial position of the delete marker is set to a position of a data block of a largest replica in the group corresponding to an end opposing a position of the last data block of the largest replica, wherein the delete marker is continually updated during deletion of replicas in the group, wherein a respective set of data blocks corresponding to a chunk from each replica in the group are deallocated concurrently, wherein each replica in the group is deleted concurrently and completely upon determining that the delete marker has reached a position within each replica corresponding to the endpoint for each replica.

2. The method of claim 1, further comprising:

determining whether a group for managing deletion of replicas of the file system exists;

based on the determination, creating a group for managing deletion of the replicas; and adding the set of replicas of the file to the group.

3. The method of claim 1, further comprising:

removing the set of replicas from the group upon completion of the deletion of the set of replicas.

4. The method of claim 1, wherein the delete marker is updated to refer to the last block of a replica of the set of replicas in the group, wherein the size of the replica is largest within the set of replicas.

5. The method of claim 1, wherein deletion of a replica in the group starts from a position within the replica indicated by the delete marker and ends at a position within the replica indicated by an endpoint, wherein the endpoint for the replica indicates the last block needed to be deleted to complete deletion of the replica.

6. The method of claim 1, further comprising:

starting a new iteration of deletion for deleting the set of replicas included in the group upon completion of deletion of a replica of the set of replicas; and updating the delete marker prior to starting the new iteration.

7. The method of claim 1, further comprising:

deleting each replica of the set of replicas concurrently by returning weight of each shared data block of the replica to another data block.

8. The method of claim 1, wherein a replica of the file of the file system selected for deletion is associated with a set of indirect data blocks, each indirect data block of the set of indirect blocks pointing to a set of data blocks, wherein the file and the set of replicas of the file system are organized in a version set.

9. The method of claim 1, wherein data blocks of a replica are de-allocated based on a delegated reference counting mechanism.

10. The method of claim 1, wherein each replica of the set of replicas is apportioned into a set of chunks, wherein each chunk of the set of chunks is processed for deletion concurrently.

11. A system for use in managing deletion of replicas of files, the system comprising:
one or more processors; and
a memory coupled to the processor including instructions causing the one or more processors to:
receive a request to delete a set of replicas of a file of a file system, wherein a replica of a file represents a state of the file at a particular prior point in time;
aggregate a subset of the set of replicas into a group, wherein the group includes replicas of the file system identified for deletion, wherein the subset of the set of replicas shares a set of data blocks with each other, wherein each replica in the group is associated with the same version set of the file system;
apportion logical address space of the subset of the set of replicas aggregated in the group into a set of chunks, wherein each chunk of the set of chunks reside at similar offset within the subset of the set of replicas in comparison with other chunks of the set of chunks, wherein each chunk indicates a contiguous set of data blocks that are processed for deletion concurrently;
delete each replica in the group concurrently by using a delete marker, wherein the delete marker is used for tracking progress of deletion of each replica in the group as respective chunk of each replica in the group is deleted concurrently, wherein each replica is associated with an endpoint corresponding to a position of the last data block of each replica that is required to be deleted, wherein and initial position of the delete marker is set to a position of a data block of a largest replica in the group corresponding to an end opposing a position of the last data block of the largest replica, wherein the delete marker is continually updated during deletion of replicas in the group, wherein a respective set of data blocks corresponding to a chunk from each replica in the group are deallocated concurrently, wherein each replica in the group is deleted concurrently and completely upon determining that the delete marker has reached a position within each replica corresponding to the endpoint for each replica.

12. The system of claim 11, further comprising instructions causing the one or more processors to:
determine whether a group for managing deletion of replicas of the file system exists;
based on the determination, create a group for managing deletion of the replicas; and
add the set of replicas of the file to the group.

13. The system of claim 11, further comprising instructions causing the one or more processors to:
remove the set of replicas from the group upon completion of the deletion of the set of replicas.

14. The system of claim 11, wherein the delete marker is updated to refer to the last block of a replica of the set of replicas in the group, wherein the size of the replica is largest within the set of replicas.

15. The system of claim 11, wherein deletion of a replica in the group starts from a position within the replica indicated by the delete marker and ends at a position within the replica indicated by an endpoint, wherein the endpoint for the replica indicates the last block needed to be deleted to complete deletion of the replica.

16. The system of claim 11, further comprising instructions causing the one or more processors to:
start a new iteration of deletion for deleting the set of replicas included in the group upon completion of deletion of a replica of the set of replicas; and
update the delete marker prior to starting the new iteration.

17. The system of claim 11, further comprising instructions causing the one or more processors to:
delete each replica of the set of replicas concurrently by returning weight of each shared data block of the replica to another data block.

18. The system of claim 11, wherein a replica of the file of the file system selected for deletion is associated with a set of indirect data blocks, each indirect data block of the set of indirect blocks pointing to a set of data blocks, wherein the file and the set of replicas of the file system are organized in a version set.

19. The system of claim 11, wherein data blocks of a replica are de-allocated based on a delegated reference counting mechanism.

20. The system of claim 11, wherein each replica of the set of replicas is apportioned into a set of chunks, wherein each chunk of the set of chunks is processed for deletion concurrently.

* * * * *